United States Patent

Weinmann et al.

(10) Patent No.: US 6,854,299 B2
(45) Date of Patent: Feb. 15, 2005

(54) ROTARY SPEED CONTROL FOR A UNIVERSAL MOTOR, IN PARTICULAR FOR A WASHING MACHINE DRIVE

(75) Inventors: Martin Weinmann, Bad Waldsee (DE); Roland Morent, Wangen (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 0 days.

(21) Appl. No.: 10/751,596

(22) Filed: Jan. 5, 2004

(65) Prior Publication Data

US 2004/0139767 A1 Jul. 22, 2004

Related U.S. Application Data

(63) Continuation of application No. PCT/EP02/07476, filed on Jul. 5, 2002.

(30) Foreign Application Priority Data

Jul. 5, 2001 (DE) .......................................... 101 32 486

(51) Int. Cl.[7] .............................................. D06F 33/02
(52) U.S. Cl. ..................... 68/12.02; 68/12.12; 68/12.16
(58) Field of Search ............................ 68/12.04, 12.02, 68/12.06, 12.12, 12.14, 12.16; 318/811

(56) References Cited

U.S. PATENT DOCUMENTS

| | | | | | |
|---|---|---|---|---|---|
| 3,596,159 | A | * | 7/1971 | Kato ............................ | 318/799 |
| 3,638,090 | A | * | 1/1972 | Ebbinge ...................... | 388/830 |
| 4,329,630 | A | * | 5/1982 | Park ............................ | 318/258 |
| 4,841,207 | A | * | 6/1989 | Cheyne ....................... | 388/811 |
| 5,218,283 | A | * | 6/1993 | Wills et al. .................. | 318/748 |
| 5,241,257 | A | * | 8/1993 | Nordby et al. .............. | 318/811 |
| 5,979,194 | A | * | 11/1999 | Matsumoto et al. ........ | 68/12.04 |

FOREIGN PATENT DOCUMENTS

| | | |
|---|---|---|
| DE | 28 41 690 A1 | 3/1980 |
| DE | 43 01 203 A1 | 7/1994 |
| EP | 0 315 273 A1 | 5/1989 |
| EP | 0 582 516 A1 | 2/1994 |
| GB | 2 031 670 A | 4/1980 |

\* cited by examiner

Primary Examiner—Frankie L. Stinson

(57) ABSTRACT

In the context of a single-phase universal motor, which has proven its worth in particular as an agile washing machine drive, the novel control provides for a substantial reduction in the remagnetization losses, rotary speed dependency, level of efficiency, and the fluctuations in the motor current pulsating at double the mains frequency, together with the resulting losses and production of noise in particular because of torque fluctuations and electromagnetically excited oscillations of the stator iron core. The motor is no longer operated by way of the phase-angle control, which is synchronized with the mains frequency, of a pulse-fired triac which is self-turning off with the current zero crossing and also no longer operated by way of the pulse duty factor of a chopper oscillating freely at high frequency. Instead, a power switch is switched on and off electronically to conduct in mains relationship over variable periods of time from before the end of a mains half-period to after the beginning of the following mains half-period. The motor current remains virtually unchanged during the switching gaps by way of a free-wheeling diode.

10 Claims, 2 Drawing Sheets

ROTARY SPEED CONTROL FOR A UNIVERSAL MOTOR, IN PARTICULAR FOR A WASHING MACHINE DRIVE

CROSS-REFERENCE TO RELATED APPLICATION

This application is a continuation of copending International Application No. PCT/EP02/07476, filed Jul. 5, 2002, which designated the United States and which was not published in English.

BACKGROUND OF THE INVENTION

Field of the Invention

The invention pertains to a rotary speed control of a universal motor. The motor is pulse-driven from an a.c. mains by way of a full-wave rectifier by way of an electronic switch which is to be periodically actuated. The invention is particularly pertinent for a washing machine drive.

The features of the general kind set forth in the foregoing paragraph are known from published German patent application DE 28 41 690 A1. There, a single-phase universal motor, that is, a commutator series-wound motor, is no longer operated directly from the mains in series with a triac triggered periodically with the mains period in a phase-angle control mode, but by way of the diagonal of a bridge rectifier circuit (Graetz rectifier), that is to say with a d.c. voltage which has no gaps but pulsates at double the periodicity of the mains frequency. That is expected to afford a reduction in the commutation losses which occur in particular at low rotary speeds as a result of the floating armature coil short-circuit. Because a triac switches off only at the zero passage of its load current, voltage control for adjusting the rotary speed of the series-wound motor is effected in each case by firing the triac at a variable moment in time prior to the end of the currently prevailing mains half-period. In that way the effective motor voltage is determined by way of a variation in the voltage-time area which always terminates with the voltage minimum at the zero passage of the sine wave at the end of the half-period; in order then with the next firing of the triac to jump again to the currently prevailing time value of the sine curve of the d.c. voltage pattern. For reliably turning off the triac, in practice a commutation throttle is to be connected in series with the motor, this being an expensive component which causes additional losses.

During each mains period, therefore, such a so-called phase-angle control configuration delivers a motor voltage which fluctuates in time and which has severe gaps. Accordingly, in spite of the smoothing action of the motor inductance, according to the respective rotary speed of the motor which is dependent on the motor voltage, the motor current exhibits pronounced ripple at double the periodicity of the mains frequency. That high-frequency current ripple means that the level of efficiency of the motor falls noticeably in comparison with operation with a constant motor current because the induction losses are frequency-proportional. As moreover the motor is usually operated at fully extended magnetization and thus in the transitional region to magnetic saturation, the torque no longer increases with motor current (at any event no longer quadratically) because, in the saturation region of the hysteresis curve, an increase in the magnetomotive force does not result in a further rise in magnetization. In contrast the copper losses rise proportionally with the square of the effective current. As the torque is also not constant with the current ripple, the mode of motor operation results in unwanted, acoustically perceptible oscillations in addition to electromagnetic alternate excitation of the stator iron core in the audible spectral range.

Instead of phase-angle control by way of a triac which is periodically fired and turned off as a consequence of current zero passage, for each mains half-period, rotary speed control can also be effected by way of the motor voltage of the universal motor, by means of the pulse duty factor of a chopper (also referred to as a stepping-down device). Because in that situation it is only a sequence of short voltage-time areas that is switched through from the pulsating direct current configuration for motor operation, the motor current itself is also severely fluctuating in phase-synchronized chopper operation, with the above-depicted disadvantages of worsened efficiency and electromagnetically caused sound irradiation.

An entirely different problem concerning the phase angle control in a d.c. motor with a mains rectifier is the feedback into the mains circuit of a very high harmonic content in a low frequency range. This is undesirable from a standpoint of the utility provider, because of its many disturbing influences. According to German published patent application DE 43 01 203 A1, the amplitude of the harmonics that are fed back into the a.c. mains can be reduced to an acceptable value by blocking the supply voltage for the motor about the voltage peak of the mains voltage. The blocking period depends on the setpoint rotary speed.

A good classification of domestic machines and in particular household washing machines which in future will be a selling argument of increasing significance requires, for energy reasons, a level of efficiency which is as constant as possible and high in all operating ranges and, for physiological reasons, quiet, smooth running, which also does not cause any acoustic disturbance, of the electric-motor drive.

SUMMARY OF THE INVENTION

It is accordingly an object of the invention to provide a speed control for a universal motor, which overcomes the above-mentioned disadvantages of the heretofore-known devices and methods of this general type and which enables operating in rotary speed-controllable manner the series-wound universal motor which is widely used for in particular washing machine drives and which in itself is optimum in terms of its operating behavior, in such a way that in particular even at high rotary speeds the electrical losses occurring in the motor, acoustic disturbances as well as a loss of efficiency are markedly reduced with a low level of increased circuitry expenditure.

With the foregoing and other objects in view there is provided, in accordance with the invention, a rotary speed control device of a universal motor supplied from an a.c. mains, in particular a motor of a washing machine. The control comprises:

a full-wave rectifier connected between the a.c. mains and the motor;

an electronic switch connected in series with the motor and the rectifier. The electronic switch is periodically driven in dependence on the mains half-period, as follows:

the switch is turned on before to mains reaches the main minimum voltage value at a first instant in time that is variably set in accordance with a desired rotary speed of the motor; and the switch is turned off at a second instant in time shortly after the mains has gone through the minimum voltage value;

a free-wheeling diode connected in parallel with the motor and non-conducting for a polarity at the output of the rectifier. The diode assures a substantially gap-free current flow through the motor.

In accordance with an added feature of the invention, the switch-on time of the switch is controlled and the switch-off time is predetermined.

In accordance with an additional feature of the invention, the switch is closed if a self-induction voltage of the motor is greater than an instantaneous d.c. voltage.

In accordance with another feature of the invention, the switch-off time of the switch is fixedly predetermined. In an alternative, the switching times of the switch fluctuate.

In accordance with a preferred embodiment of the invention, there is provided a regulator supplying a switch-on time for switching on the switch in accordance with a regulating deviation between a rotary speed-dependent voltage and a reference rotary speed predetermined in the form of a reference voltage. The rotary speed-dependent d.c. voltage may be provided by a tachogenerator associated with the motor.

In accordance with a concomitant feature of the invention, a blocking filter for capacitive short-circuiting is connected across the output of the rectifier.

In other words, the objects of the invention are achieved in that the motor is fed with more advantageous voltage-time areas (than in the case of conventional phase-angle control at the end of a respective mains half-wave), more specifically now with a sequence of two immediately successive voltage-time areas of lower peak value, which are on both sides of a voltage minimum. The inclusion also of a voltage-time area at the beginning of a mains half-wave, because of lower voltage and current fluctuations with an overall identical voltage-time integral over a longer period of time with a lower effective motor current, affords the same mean torque with a better level of efficiency, just by virtue of lower re-magnetization losses. For, for the same sum areas, the peak values are now lower than in the case of phase-angle control only prior to the end of a respective mains period; with the consequence that the current fluctuates considerably less because of the shorter gaps and the lower peak values, and because of the inductances in the motor circuit is virtually constant even as far as a certain residual ripple. This causes the disappearance of the remagnetization losses in the transition to magnetic saturation as well as the acoustically disturbing electromagnetic alternate excitations in respect of the stator iron core.

Other features which are considered as characteristic for the invention are set forth in the appended claims.

Although the invention is illustrated and described herein as embodied in a rotary speed control for a universal motor, in particular for a washing machine drive, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
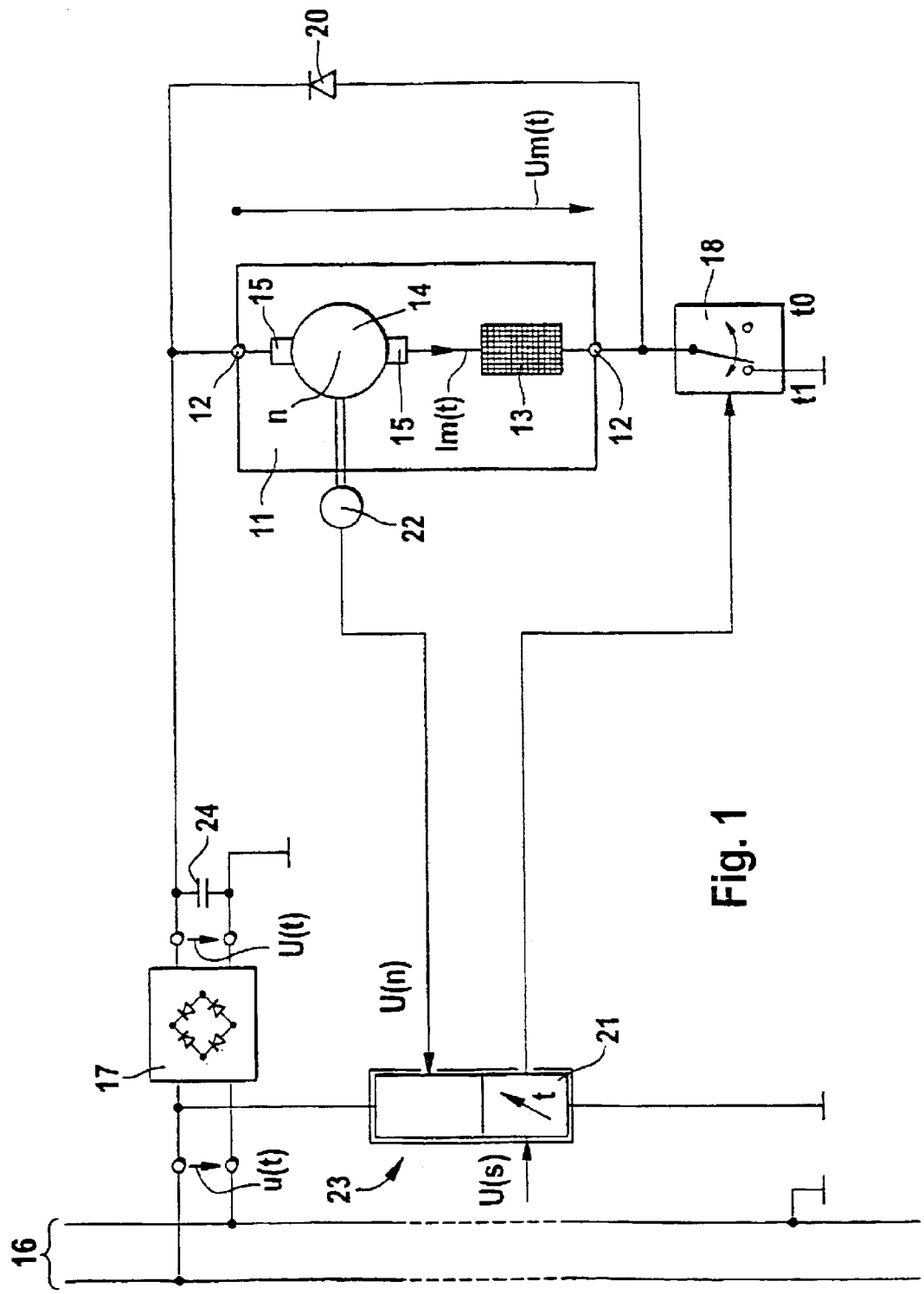
FIG. 1 is a diagram of a control circuit according to the invention, which is expanded for rotary speed regulation, for a highly agile universal motor.

Referring now to the figures of the drawing in detail and first, particularly, to FIG. 1 thereof, there is shown a single-phase universal motor 11 that involves a conventional commutator series-wound motor which can be operated both with d.c. voltage and also with a.c. voltage. Because of its voltage-controllable rotary speed agility (great jumps in the operating rotary speed) it is particularly suitable for household washing machines with a spin-dry mode. The motor voltage Um(t) which is applied across the motor terminals 12—12 produces a motor current Im(t) by way of the series circuit consisting of field windings 13 and armature windings. The armature windings which are displaced spatially relative to each other on the rotor are connected for that purpose to mutually diametrically opposite segments of a commutator 14 and thus in the course of the rotary movement of the rotor are successively incorporated by way of brushes 15 or similar current pick-ups (collectors) into the motor series circuit.

Figure 2:
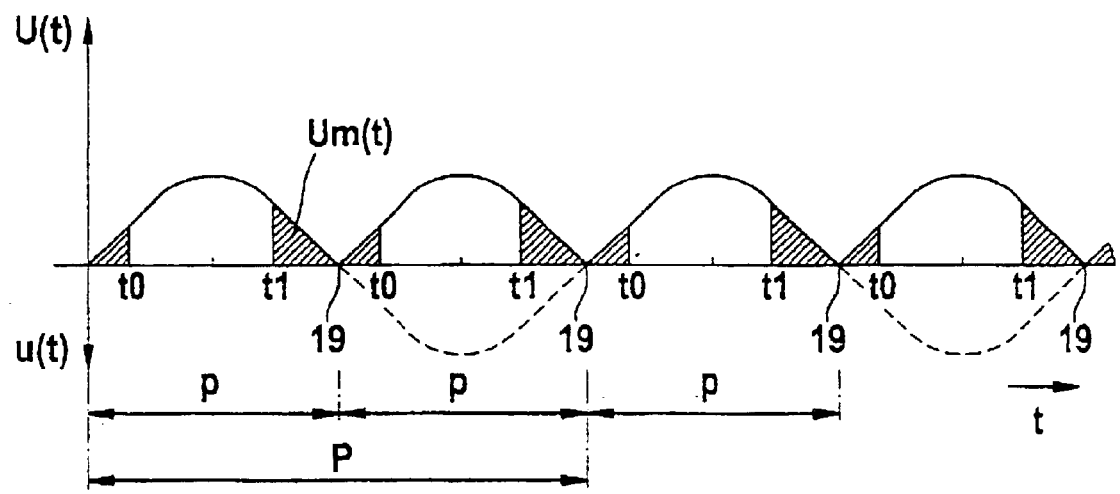
FIG. 2 is a graph plotting the voltage configuration at the output of the full-wave rectifier specifying the voltage-time areas which are imposed on to the universal motor.

In the present exemplary embodiment, which is typical of the invention, the energy for operation of the motor 11 is supplied from the single-phase house a.c. mains 16 by way of a rectifier 17 in the form of a full-wave bridge circuit or Graetz circuit, so that the rippled d.c. voltage pattern U(t) occurs at double the mains frequency in non-gap configuration at the rectifier 17 at the output side thereof. These relationships are diagrammatically shown in FIG. 2 with reference to the mains a.c. voltage u(t)—added in broken line. By way of an electronically actuable switch 18, at a time t1 towards the end of each half-period p, the motor 11 is connected to the output of the rectifier 17 so that from now on and initially over the rest of that half-period p, the d.c. voltage U(t) which fluctuates in respect of time, of the voltage-time area hatched in FIG. 2, is available as the motor voltage Um(t). With the drop in the d.c. voltage pattern U(t) to the minimum value 19 which corresponds to the zero crossing of the mains a.c. voltage u(t) upstream of the rectifier 17, the path of the switch 18 however is not yet blocked again. Rather, the switch 18 is switched off again only at a time t0 after the beginning of the next following half-period p, in which respect, as diagrammatically shown in FIG. 2, the switching-on and switching-off times t1-t0 are generally not symmetrical with respect to the voltage minimum value 19. It is thus between the two successive times t1 and t0 at the beginning of a longer one and at the end of a shorter one of voltage-time areas Um(t) which occur in succession in opposite relationship in the time pattern (t).

Figure 3:
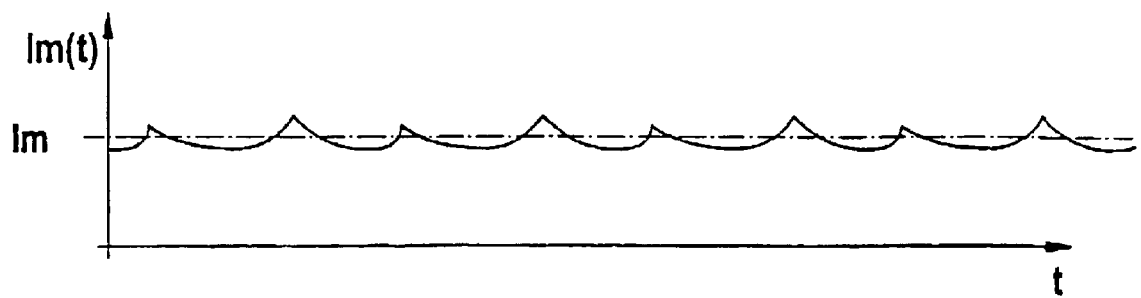
FIG. 3 is a time graph showing, on a greatly exaggerated scale, in qualitative terms an exemplary current configuration for the voltage superimposition shown in FIG. 2.

During the period of time t1-t0 the motor current Im(t) (FIG. 3) flows from the rectifier 17 by way of the winding series circuit in the motor 11 and the switch 18 back to the rectifier 17. The motor current Im(t) experiences only minimal decay at the transition between successive half-periods p—p as the switch 18 is closed if the self-induction voltage at the motor 11 is greater than the instantaneous value in respect of time of the voltage U(t) available from the rectifier 17 because then the motor inductance determines the flow of current.

In accordance with Lenz's rule relating to conservation of energy the motor current Im(t) still seeks to continue to flow in the previous direction when the switch 18 is opened in the supply circuit upstream of the motor 11. Therefore, as from opening of the switch 18, at the time t0, a circuit is closed through the motor 11 by way of a free-wheeling diode 20 which is connected in parallel therewith and which is non-conducting in respect of the polarity at the output of the rectifier 18. Desirably, the time t0 is shortly after the minimum value 19 of the voltage pattern U(t) in order not to allow the sinusoidal current I(t) supplied from the rectifier 17 to rise excessively prior to switching-off. Therefore, in regard to the demands of a practical situation, it is sufficient to fixedly predetermine the periodic switch-off time t0 and only vary the switch-on time t1 for influencing the rotary speed as is previously known as such.

In any event the current Im(t) continues to flow practically constantly in the previous direction even after the opening time t0, in the gap between two voltage-time areas Um(t) which occur in succession at the beginning and the end of a half-period p. If then the switch 18 closes again towards the end of the currently prevailing half-period p at the time t1, the motor current Im(t) supplied by the rectifier 11 is again impressed on the self-induction current Im(t). Because therefore the current flow Im(t) by way of the motor 11 is not actually interrupted, contrary to the geometry of the voltage-time areas Um(t) (FIG. 2), an almost constant motor current Im (FIG. 3) flows, which fluctuates slightly only in accordance with the instantaneous values at the voltage rise U(t1) and upon voltage collapse U(t0), in accordance with the switch control procedure, as is diagrammatically shown in qualitative terms in exaggerated fashion in FIG. 3. The magnitude of that mean motor current Im is primarily determined by the magnitude of the integral of the voltage-time areas between the switching points t1-t0.

As the motor current Im(t) now no longer exhibits any great fluctuations and in particular does not periodically drop towards the value zero, there is practically no further remagnetization over the half-period p so that motor operation remains in the saturation range of the magnetization curve, with a constant magnetomotive force. In that way the current fluctuation-conditioned remagnetization losses as well as power losses as discussed above are practically avoided. The noise loading is noticeably reduced and can be still further lowered if the phase switching points t1 and t0 are varied somewhat on both sides of the voltage minimum value 19 from one half-period p—p to another, for the harmonics spectrum which fluctuates in that way approaches the noise perception of the human ear.

The switch 18 which is disposed in series in the d.c. circuit with the motor 11 may involve a power switching transistor which, as shown in FIG. 1, is actuated from an adjustable sender 21 for at least the period of time t1 prior to the voltage minimum value 19 between two successive half-periods p—p of the unsmoothed d.c. voltage pattern U(t). The switch-off time to directly after the minimum value 19 can be fixedly predetermined or can statistically fluctuate slightly about a preset value. So that the switching procedures with attendant harmonics are not propagated in the form of electromagnetic interference by way of the mains 16, the output of the rectifier 17 is connected with a blocking filter 24 which implements a high-frequency short-circuit across the connecting terminals of the rectifier 17.

In order to supplement that control circuit as shown in FIG. 1 to afford a rotary speed regulating circuit, the motor 11 is equipped with a tachogenerator 22 which delivers a rotary speed-proportional d.c. voltage U(n) as an actual value, to a regulator 23. That actual value U(n) is compared to a variably predeterminable reference value U(s) and the regulating deviation dn is converted by the sender 21 into the switching period t1-t0, at any event into a switching time t1.

In that way the regulator 23 controls the adjusting member of the regulating section in the form for example of an IGBT switching transistor 18 in the motor circuit Im(t). That mode of operation initially represents voltage-controlled rotary speed regulation at the motor 11 because the motor current Im is adjusted in accordance with the respective rotary speed n of the motor and the counter-induction voltage dependent thereon in relation to the motor voltage Um(t); and that finally corresponds to torque regulation if the regulating deviation dn found in the regulator 23 becomes zero.

At any event, in the case of a single-phase universal motor 11 as has proven its worth in particular as an agile washing machine drive, the invention can provide for a substantial reduction in the remagnetization losses, rotary speed dependency, level of efficiency and the fluctuations in the motor current Im(t) pulsating at double the mains frequency, together with the resulting production of noise because of torque fluctuations and electromagnetically excited oscillations of the stator iron core, insofar as the motor 11 is no longer operated merely by way of the phase-angle control, which is synchronized with the mains frequency, of a pulse-driven triac which is self-turning off with the current zero passage and also no longer operated by way of the pulse duty factor of a chopper oscillating freely at high frequency, but by way of a power switch 18 which can be switched on and off electronically and which conducts in mains relationship over variable periods of time t1-t0 from before the end of a mains half-period p to after the beginning of the following mains half-period, wherein the motor current Im remains maintained virtually unchanged during the switching gaps by way of a free-wheeling diode 20.

We claim:

1. A rotary speed control device of a universal motor pulsatingly fed from an a.c. mains having a half-period and a voltage minimum value, the control device comprising:
   a full-wave rectifier connected between the a.c. mains and the motor, said rectifier having an output;
   an electronic switch connected in series with the motor and said rectifier, said electronic switch being periodically driven in dependence on the mains half-period by:
      switching on the switch prior to the main minimum voltage value at a first instant in time variably set in accordance with a rotary speed of the motor to be set; and
      switching off the switch at a second instant in time shortly after the respective minimum voltage value; and
   a free-wheeling diode connected in parallel with the motor and non-conducting for a polarity at said output of said rectifier, for assuring a substantially gap-free current flow through the motor.

2. The speed control device according to claim 1 configured to drive a motor of a domestic machine drive.

3. The speed control device according to claim 2, wherein the domestic machine is a washing machine.

4. The speed control device according to claim 1, wherein a timing of the first instant in time is controlled with the speed of the motor and a timing of the second instant in time is fixedly set.

5. The speed control device according to claim 1, wherein, in a typical speed range of the motor, the second instant in time is closer to the minimum voltage value than the first instant in time.

6. The speed control device according to claim 1, which comprises a tachogenerator associated with the motor for supplying the rotary speed-dependent d.c. voltage.

7. The speed control device according to claim 6, which comprises a regulator supplying a switch-on time for switching on said switch in accordance with a regulating deviation between a rotary speed-dependent voltage and a reference rotary speed predetermined in the form of a reference voltage.

8. The speed control device according to claim 1, wherein switching times of said switch, as defined between the first and second instants in time, fluctuate.

9. The speed control device according to claim 1, wherein said switch is closed if a self-induction voltage of the motor is greater than an instantaneous d.c. voltage.

10. The speed control device according to claim 1, which comprises a blocking filter for capacitive short-circuiting connected across said output of said rectifier.

* * * * *